United States Patent Office 3,732,074
Patented May 8, 1973

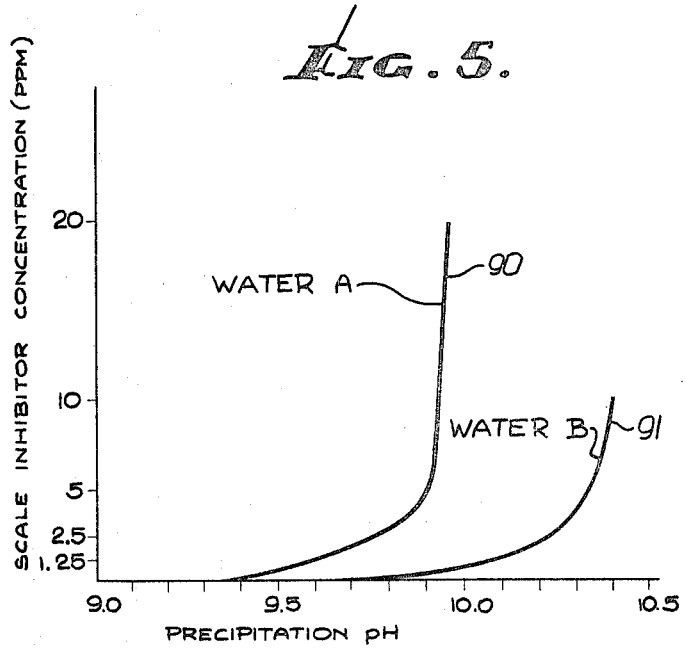
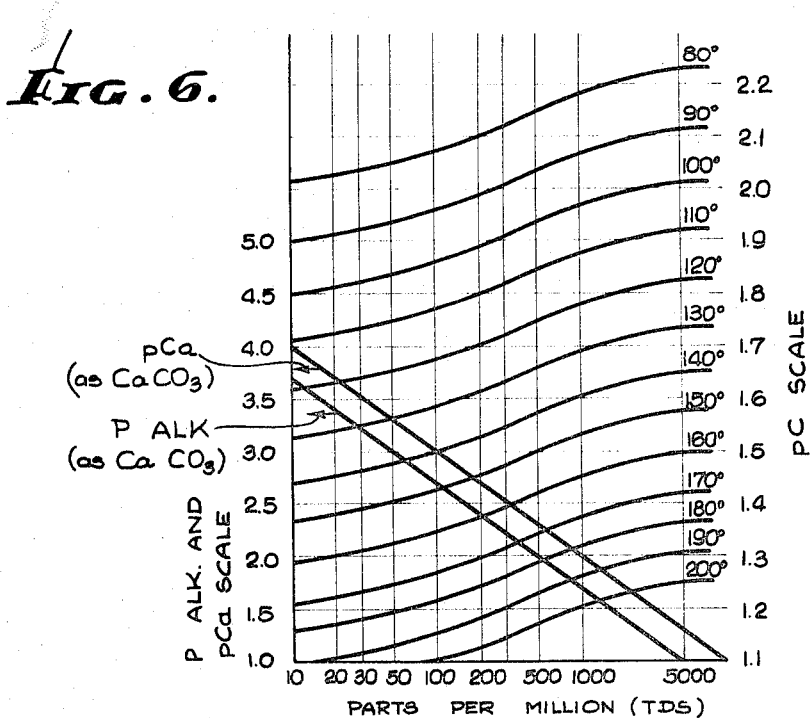

3,732,074
SCALE METER
Herbert Feitler, Jr., 10346 Mississippi Ave.,
Los Angeles, Calif. 90025
Filed Jan. 6, 1971, Ser. No. 104,311
Int. Cl. G01n 21/28, 33/18
U.S. Cl. 23—230 R  21 Claims

ABSTRACT OF THE DISCLOSURE

A scale meter comprising a mixing head for mixing a reagent and a water sample to cause the precipitation of particles in the water, a holding tube to allow the precipitate particles to grow to a detectable size, and a detector cell having a light source and a photo cell to detect light scattered from the precipitate particles in the water. This scale meter can be employed to determine the critical or true scaling pH of a given water. This scale meter can also be employed in a scale preventative system for a water system. In a scale preventative system the signal from the photo cell is amplified and compared in a comparator to a second signal which is equivalent to a signal from a water having scale conditions. When the amplified signal is larger than the second signal the comparator actuates means for preventing scaling in the water system.

This invention relates to a method and apparatus for automatically anticipating the deposition of compounds from solution before scale forming precipitation takes place. More particularly this invention is directed to a method of anticipating scaling and preventing the formation of scale in pipes, heat exchanger tubes, boilers and recirculating cooling water systems.

Scale formation, the deposition of chemicals, is a serious problem in many water systems. Scale can reduce the cross-sectional area of pipes in water distribution systems and, in various heat exchange services, interferes with the heat exchange process by greatly reducing operating efficiencies by acting as a heat insulator. Also, scale formation often leads to corrosion and to the formation of pits under the scale. When scale formations become thick enough to interfere with normal operation, the system must be shut down and the scale removed by chemical or mechanical means. The costs associated with scaling include those relating to reduced efficiency, down time for cleaning, the cost of the cleaning itself and the metal loss which occurs during the cleaning process.

Scale formation in heat exchange service is a common problem even though at first thought it seems strange that scale should form on heated surfaces since most substances have solubilities which increase with increasing temperature. However, $CaCO_3$ and $CaSO_4$ are less soluble at operating temperatures than they are at room temperature. $CaCO_3$ is the most commonly encountered scaling material. Because of the chemistry of the carbonate ion, it has not been possible by simple means to predict the conditions which will cause $CaCO_3$ to precipitate.

In 1936 W. F. Langelier published his widely used Saturation Index [Langelier, J. Am. Water Works Assoc., 28, 1500–21 (1936)]. From theory, he showed that the point at which water was neither corrosive nor scale-forming was dependent on the relationship between the $Ca^{++}$ concentration, the alkalinity, the total dissolved solids, the hydrogen ion concentration (pH) and the temperature. From the index, these parameters yielded the pH of saturation ($pH_s$), the pH at which precipitation of scale would occur. This value, $pH_s$, could be compared to the actual pH ($pH_a$) of a water. If $pH_a$ was higher than $pH_s$, scale would form; values of $pH_a$ lower than $pH_s$ led to corrosion.

Since 1936, numerous variations, extensions and revisions of the Langelier Index have appeared. In common to all such indices are the parameters defined by Langelier and these relationships are the common factors on which modern water treatment is based. A review of the measurement techniques used to obtain the information needed to use the Saturation Index is given below to illustrate the difficulty of automating the measurement.

$Ca^{++}$—measured by titrating with soap solution or by EDTA titration. It is rarely measured continuously despite the recently developed specific ion electrode since this device is sensitive or responsive to large concentrations of $Na^+$ and relatively large concentrations of $Na^+$ are present in many aqueous systems.

Alkalinity—usually measured by manually titrating with a standard NaOH solution to the phenolphthalein and/or methyl orange indicator end points.

Total Dissolved Solids (TDS)—commonly determined by measuring the electrical conductivity or resistivity of the water using known concentrations of NaCl as the calibration standard.

pH—measured by colorimetric techniques, e.g., adding known amount of pH color indicator reagent and comparing resulting color to standardized color sample or glass electrode techniques (pH meter).

Temperature—easily measured by any of several methods, such as a mercury bulb thermometer or standardized thermocouple. TDS, pH and temperature are easily measured both manually and continuously. Alkalinity and calcium ion concentration require titration techniques and automatic titrators tend to be complex and unreliable. Even if all the measurements could be made easily by reliable means, a small computer would be needed to determine $pH_s$. The need for a computer becomes apparent when the Saturation Index is put to use.

A useful plot or chart of the Langelier Saturation Index appears in Powell S. T., "Water Conditioning for Industry," McGraw-Hill Book Company, Inc., New York, N.Y., 1954, pg. 279 (see FIG. 6 of the drawings). The chart is used in the following manner: for a water sample having a temperature=120° F., a pH=8.00, a Ca concentration=120 p.p.m., an alkalinity=100 p.p.m. and a total solids=210, the $pH_s$=7.32=2.92 (pCa) +2.70(pALK)+1.70(pC at 1 20° F.). The Saturation Index for the water is +.68=8.00−7.32. Essentially, knowing the $Ca^{++}$ concentration, one reads from the plot a value for pCa. Similarly, the known methyl orange alkalinity value is used to read a value of pAlk. The TDS value combined with the hottest expected temperature allows a value of pC to be read from the plot. The sum of these values, pCa+pAlk+pC, equals the pH of saturation, $pH_s$, which must be compared to $pH_a$, the actual pH. There is a non-linear relationship between the values of pCa, pAlk, etc., and a computer is needed to actually manipulate the data on an automatic basis for varying values.

It should be noted that Langelier experimentally verified his theories by use of the Marble Test. This test, which still is in routine and widespread use, consists of adding to a sample of water a small quantity of reagent grade $CaCO_3$ powder, allowing intimate contact for five minutes or longer, filtering the sample and measuring the pH of the filtrate. The pH is, of course, equal to $pH_s$ since the $CaCO_3$ powder will dissolve to the extent that the water sample is unsaturated or will serve as "seed" crystals on which $CaCO_3$ will precipitate if the water sample is supersaturated. Despite the fact that the Langeleir Index and the Marble Test are consistently in agreement, water treatment practice, in general, is to deviate from the $pH_s$ of the Langelier Saturation Index and the Marble Test.

For example, it is common practice in recirculating cooling water system to maintain the actual pH ($pH_a$) from 0.6 to 1.0 above the saturation pH ($pH_s$). In other words, the water is kept on the scaling side of the theoretical scaling point. This practice is indicated to avoid corrosion and in practice has not been found to result in scaling though both the Saturation Index and the Marble Test predict that it will.

Another water treatment practice is to deposit a layer of $CaCO_3$ scale to prevent corrosion. While this procedure is antiquated in terms of recirculating water systems, it is widely used in water distribution systems. Again, the Saturation Index and Marble Tests are used only as base points from which concentrations of $Ca^{++}$ and $CO_3^=$, much larger than those predicted, are used to lay down the initial protective layer of $CaCO_3$. Speed of building the layer is not the consideration here. Rather, experience shows that the layer does not deposit at values slightly above the theoretical saturation point. It is significant that once that layer is formed, the scale forming concentrations must be reduced to close to those predicted by theory, i.e., Saturation Index or Marble Test, or the pipes are soon filled with scale.

The Saturation Index concepts are the basis on which the invention operates. However, the present invention takes into account and offers insight into the differences between what the Saturation Index predicts and what experience has shown to be the best operating procedures and parameters. In further explaining these concepts, recirculating water systems will be used for illustrative purposes; however, these scale measurement concepts apply to many other systems.

In recirculating cooling water systems, the greatest economy of treatment and the minimum water pollution—chemical or thermal—is achieved by reusing the water as many times as possible. The water may not be used an unlimited number of times because, as it passes through the cooling tower where it cools itself by evaporation, the dissolved solids increase in proportion to the number of times the water is reused. These dissolved solids include scale forming ions such as $Ca^{++}$, $CO_3^=$, and $SO_4^=$. When the concentration of these ions becomes large in terms of the Saturation Index paramater relationships, scale will form and this fact sets a limit on the number of times the water can be reused. While lower pH values allow higher concentrations of scale forming ions to be present or higher operating temperatures to be used, lower pH values also lead to corrosion. For this reason, conventional treatment programs utilize corrosion inhibitors and usually select a pH control point between 7.0 and 7.5.

After the operating pH is fixed, the make-up water is analyzed and projections made as to how many times the water can be reused—the solids in the water concentrated—before precipitation occurs. This projection makes use of the Saturation Index and usual practice is to utilize a $pH_s$ which is 0.6 to 1.0 units in excess of what the Index predicts. In other words, the water deliberately is controlled on the scaling side of what the Saturation Index predicts and, in virtually all instances, scaling does not occur.

Thet newer water treatment programs utilize aminomethylene-phosphonates as scale inhibitors for $CaCO_3$ and $CaSO_4$ scales. At this time they are not effective for preventing the glassy silicate scale, $CaSiO_2$. These treatment programs allow the $pH_a$ to seek its buffered equilibrium value which is in the range of 8.5 to 9.2 and which may go higher in some cases. These treatment programs, then, have no pH control, yet they still prevent scale formation.

In these water treatment programs, TDS is controlled to keep $Ca^{++}$ in the 300–500 p.p.m. range for treatment dosages of 5–10 p.p.m. (by weight) of scale inhibitor. In some cases the $Ca^{++}$ may be allowed to go as high as 800 p.p.m. with a dosage of 25 p.p.m. of scale inhibitor. The factors which limit the TDS and the cycles of concentration are as follows:

(1) Silicate concentration.
(2) Fouling build-up (solids).
(3) Iron or other such special considerations.
(4) Chlorides in high temperature operation.

In these treatments, the methyl orange alkalinity would be in the order of 300–400 p.p.m. with 800 as the maximum value. Using 500 p.p.m. $Ca^{++}$, 500 p.p.m. alkalinity water temperature of 120° F., and five cycles of concentration with 500 p.p.m. TDS in the make-up water, $pH_s$ would calculate out as follows: (see FIG. 6)

pCa ........................................... 2.3
pAlk .......................................... 2.0
$pC_{120°}$ ...................................... 1.82
$pH_s$ .......................................... 6.12

With the $pH_a$ values varying from 8.5 to 9.2, it is apparent that the water is supersaturated and has a positive index of 2.4 to 3.1 (pH units). Thus both conventional and the more modern water treatment programs use the Saturation Index as a departure point from which operating conditions are selected so that the water is supersaturated. Despite this deliberate operation on the scaling side of the index, such operation does not usually result in scale deposition.

These differences between what theory predicts and operating procedure based on experience have been a source of confusion and have added to the complexity of using or automating the Saturation Index for automatic control purposes.

In order to develop a more accurate method of determining the scaling parameters or conditions of water, I performed a series of tests in which NaOH was added to various water samples until the first trace of precipitate appeared. The pH at this point, $pH_{OH}$, consistently was higher than $pH_s$ from the Saturation Index. Also, $pH_{OH}$ consistently was higher than $pH_s$ as determined by the Marble Test.

The difference in $pH_s$ from both the Saturation Index and the Marble Test results and $pH_{OH}$, the NaOH precipitate results, may well be due to the effect of particle size (see Prutton and Maron, Fundamental Principles of Physical Chemistry (MacMillan Co., N.Y., N.Y., 1947, p. 152)). The $CaCO_3$ added in the Marble Test (Baker Chemical Co. #1300, Precipitated $CaCO_3$ Powder, U.S.P.) settles by gravity in a few minutes time while the precipitate formed by NaOH addition settles only after many hours. Thus, the $CaCO_3$ particles in the Marble Test are larger in size that those formed by NaOH addition. The smaller the particle size the higher the solubility. An example given in the above cited reference shows $BaSO_4$ doubling in solubility for an 18-fold decrease in the $BaSO_4$ particle size. Another consistent factor is that the pH reduces with time from the point at which precipitate first becomes visible. With increased time, the precipitate becomes greater and the pH is reduced to the point where it approaches the value of $pH_s$ from the Marble Test. Thus, as crystal growth occurs versus time, the amount of $CaCO_3$ which precipitates increases since solubility decreases as particle size increases. The pH is reduced as $CaCO_3$ precipitates because of the following reactions:

(1) $HCO_3^- = H^+ + CO_3^=$
(2) $OH^- + H^+ = HOH$
(3) $Ca^{++} + CO_3^= = CaCO_3$

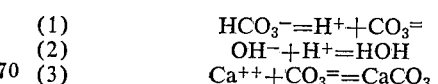
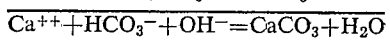

$Ca^{++} + HCO_3^- + OH^- = CaCO_3 + H_2O$

Initially, the addition of $OH^-$ takes $H^+$ out of solution (2) causing more free $CO_3^=$ to be in solution (1). When reaction (3) occurs, $CO_3^=$ is removed from solution causing reaction (1) to shift to the right, which increases the $H^+$ concentration and thus lowers the pH. The $CaCO_3$ probably first precipitates on a molecular basis and the crystals grow in size until they are visible, this effect is accompanied by a reduction in solubility.

Langeleir used a 24 hour Marble Test to verify the theoretical predictions of his index. The significant point is that he used a precipitated solid; thus the Saturation Index is based on "large" particles rather than molecular or microscopic particles. Accordingly the Saturation Index is based on physical and chemical conditions which are not identical to the conditions in water treatment systems.

As noted earlier, the water treatment industry has, in general, maintained the $pH_a$ about 1.0 pH units in excess of the $pH_s$. From the laboratory results obtained during the development of the Scale Meter, it seems apparent that the 1.0 pH unit difference really takes a system closer to the balance point between non-scaling and non-corrosive conditions when the particle size of the scale is molecular or microscopic in size. In other words, predicating the scale formation point on the solubility of visible size particles introduces parameters into the Langelier Index which have been compensated for over the years by the use of the 1.0 adjustment on an empirical basis.

Other water treatment practices which are consistent with this picture is the recognized practice that to lay down a protective layer of $CaCO_3$ a much larger concentration of $Ca^{++}$ and $CO_3^=$ are used initially to establish the film than the Saturation Index predicts and that these concentration levels are then reduced to merely maintain the film. Once the film is formed, relatively large crystals are present and the concentration of ions is reduced to prevent excess scale build-up, which readily occurs once the initial layer of $CaCO_3$ is built up. Apparently the large crystals in the $CaCO_3$ layer promote scaling and precipitation in the same manner the $CaCO_3$ powder promotes precipitation in the Marble Test.

Another instance of interest is the procedure used in cold lime softeners of older design. It was quite common to design into the system retention tanks of sufficient size to hold 4–12 hours output so that supersaturated $CaCO_3$ would precipitate out in the treatment plant retention tanks rather than in the distribution pipes. Modern lime softening plants flow the water plus lime (CaOH) through a $CaCO_3$ bed on which the newly formed $CaCO_3$ precipitates. In essence, this procedure is exactly what is done in the same manner the $CaCO_3$ powder promotes precipitability of a solid is dependent upon the particle size of the solid.

Having established a theoretical basis for the discrepancies between the Saturation Index and Marble Test results and actual practice, I then discovered a method of determining the pH at which precipitation and scaling occur. To establish this pH, the critical pH ($pH_c$), a series of tests were run. Using NaOH, the pH of water samples was adjusted to the values shown in Table 1 and the samples visually observed for the times shown. Water "A" had a composition of 400 p.p.m. $Ca^{++}$, an alkalinity of 300, a TDS of 1900 and a temperature of 22° C. (71.6° F.). Water "B" was of the same composition but had 5 p.p.m. of scale inhibitor added to it.

TABLE 1 pH versus Time Relationship for Precipitate to Appear

| Water A | | | Water B | | |
|---|---|---|---|---|---|
| pH | Time | Precipitate | pH | Time | Precipitate |
| 9.1 | 1 minute | Yes. | 9.85 | 1 minute | Yes. |
| 8.95 | 2.5 minutes | Yes. | 9.65 | 5 minutes | Yes. |
| 8.75 | 11 minutes | Yes. | 9.45 | 7 minutes | Yes. |
| 8.60 | 40 minutes | Yes. | 9.20 | 45 minutes | No. |
| 8.50 | 16 hours | No. | 9.20 | 18 hours | Yes. |

It should be noted that the appearance of precipitate was determined by eye and there is difficulty in determining the first instant at which precipitate appears, especially in the samples with scale inhibitor since the precipitate is much more finely divided. However, as will be further explained later, with time the amount of precipitate increases so that questions relating to the early presence or absence of precipitate are easily resolved. That is, if there is even a faintly perceptible amount of precipitate present, given a somewhat longer time the precipitate becomes unmistakably visible. At the same time, the pH of the water decreases toward the Marble Test point. Table 2 illustrates this point. The water was from the water "A" batch and had an adjusted pH of 8.80. Precipitate was not apparent after 10 minutes but was visible after 15 minutes at which time the following pH versus time data was taken.

TABLE 2 pH decrease with time in a precipitated sample

| Elapsed time (min.) | pH |
|---|---|
| 0 | 8.80 |
| 15 | 8.75 |
| 20 | 8.45 |
| 25 | 8.25 |
| 30 | 8.15 |
| 35 | 8.10 |
| 40 | 8.05 |
| 45 | 8.00 |
| 50 | 8.00 |
| 60 | 8.00 |

The Marble Test $pH_s$ for this sample was 7.85 and it is likely that this pH would have been reached had the test been extended for a longer time.

Additional tests were run to compare the results obtained by the NaOH addition to the results obtained by heating the sample. These data are shown in Table 3. Both the $pH_{OH}$ (the precipitation pH brought on by the addition of NaOH) and the precipitation temperatures were taken within one minute of the water being at the particular value shown in the following table:

TABLE 3

OH- and Heat Test Precipitation Results Compared to $pH_s$

| Water analysis | | | | | OH test results | | Heat test results | | | | |
|---|---|---|---|---|---|---|---|---|---|---|---|
| CA | Alk. | TDS | Temp., °C. | $pH_s$ | $pH_{OH}$ | $pH_{OH}-pH_s$ | Ppt. temp., °C. | ΔpH temp. | Test pH | $pH_{HT}$ | $pH_{HT}-pH_s$ |
| 300 | 300 | 1,100 | 16 | 7.18 | 9.50 | 2.32 | | | 8.00 | | |
| 400 | 300 | 1,200 | 18 | 7.00 | 9.45 | 2.45 | 68 | 0.88 | 8.60 | 9.48 | 2.48 |
| 400 | 400 | 1,300 | 16 | 6.95 | 9.15 | 2.20 | 85 | 1.13 | 8.00 | 9.13 | 2.18 |
| 450 | 450 | 1,400 | 19 | 6.78 | 9.20 | 2.42 | 85 | 1.05 | 8.10 | 9.15 | 2.15 |
| 500 | 500 | 1,500 | 18 | 6.68 | 8.95 | 2.27 | 80 | 1.02 | 8.05 | 9.07 | 2.39 |
| 600 | 500 | 1,600 | 18 | 6.61 | 8.80 | 2.19 | 75 | 0.98 | 8.00 | 8.98 | 2.37 |
| 550 | 550 | 1,600 | 18 | 6.60 | 8.85 | 2.25 | 85 | 1.08 | 8.00 | 9.08 | 2.48 |

NOTE.—Ppt. temp. is the water sample temperature at which precipitation first is visible. $pH_{HT}$ is the sum of the Test pH (pH of water sample at the initiation of the test) and Δ pH temp., the equivalent range in the value of pC (see Fig. 6) due to the difference between the initial temperature and the ppt. temp.

In each case the value of $pH_s$ calculated from the Saturation Index was subtracted from the test result ($pH_{OH}$ and $pH_{HT}$). The average difference ($pH_{OH}-pH_s$) from the NaOH test was 2.30 and the average difference ($pH_{HT}-pH_s$) from the heat test was 2.38. The close agreement of the two test methods shows that there is a relatively constant difference between the calculated value of $pH_s$ and the actual precipitation pH, and that any of the Saturation Index's parameters can be changed to give the same reproducible results.

The data in Table 1 showed that precipitate formation is a time dependent phenomena and that there is a point considerably in excess of that predicted by the Saturation Index at which precipitation does not occur. Table 2 presented data which confirms the theory that the difference between the Saturation Index and Marble Test results and the critical pH or scaling pH, at or above which precipitation does occur, is due in part to the particle size of the scaling solids.

Table 3 shows a constant relationship between $pH_s$ and the precipitation pH, the pH at which precipitation occurs. The resultant Table 3 shows that for given $Ca^{++}$, alkalinity, TDS, Temperature and pH, the precipitation pH can be determined by $OH^-$ or temperature increases. By relating $pH_c$ (the critical pH below which precipitation does not occur, see Table 1) to the precipitation pH value I have invented an effective means for determining the actual scaling pH, the $pH_c$, of water. Furthermore, since the precipitation point of a water sample has been shown to have a fixed relationship to $pH_s$, $pH_s$ can be related to $pH_c$ so that more accurate operating conditions can be predicted.

The correlation of $pH_c$ to $pH_s$ is given in Table 4. Water samples of the composition shown were run with and without scale inhibitor. The water sample's pH was increased by adding aqueous NaOH until precipitate appeared within two minutes' time when the water was heated to 185° F. The equivalent precipitation pH value for the water sample at 80° F. [ppt. pH (80° F.)] was calculated by adding the 105° F. (185° F.–80° F.) pC shift equivalent (see FIG. 6) to the ppt. pH value (185° F.).

TABLE 5

Performance Improvement Using Scale Inhibitor

| Water analysis | | | pH$_c$ | | pH$_{c/5}$– |
|---|---|---|---|---|---|
| Ca | Alk. | TDS | 0 p.p.m. inhibitor | 5 p.p.m. inhibitor | pH$_{c/0}$ |
| 300 | 200 | 1,600 | 9.09 | 9.77 | 0.68 |
| 400 | 300 | 1,900 | 8.54 | 9.06 | 0.52 |
| 500 | 400 | 2,300 | 8.31 | 9.01 | 0.70 |

As was stated above, precipitation increases with time and with a corresponding decrease in pH which after some length of time approaches the $pH_s$ value obtained from the Marble Test.

Since precipitate growth is a function of time, factors which influence reaction rates will also influence precipitate growth. Data obtained with the preferred embodiment of the apparatus is presented hereinafter which demonstrates the influence of temperature and the primary salt effect on the rate of precipitate growth.

Time also plays a vital role in distinguishing between samples with adequate scale inhibitor residuals and samples which are deficient in inhibitor residual or lack inhibitor. The aminomethylenephosphonates and, in general, other scale inhibitors do not prevent precipitation but, rather, keep precipitate particles separated to inhibit the formation of large crystals. This is believed to be the reason why the polyphosphate inhibitors tended to prevent the formation of hard scales. The phosphonate inhibitors, being a more recent development, have been in use long enough to establish that they have superior scale preventing properties over the previous scale inhibiting treatments.

However, the fact that the scale inhibitors do not entirely prevent precipitation (even though they prevent scale deposition) can lead to ambiguous results unless certain conditions are observed. The use of a scaling inhibitor in a water system will affect the response of the

TABLE 4

Correlation of $pH_s$ to $pH_c$ in various water samples

| Sample | Water analysis | | | | $pH_s$ (80° F.) | ppt. pH (185° F.) | Equivalent ppt. pH (80° F.) | Actual pHc | Actual ppt. pH– pHc | $pH_c$ (ppt. pH (80° F.)– 0.6) | pHc= pH$_s$ plus– |
|---|---|---|---|---|---|---|---|---|---|---|---|
| | CA | Alk. | TDS | Inhibitor | | | | | | | |
| 1 | 300 | 200 | 1,600 | 0 | 7.11 | 8.80 | 9.69 | | | 9.09 | 1.98 |
| 2 | 300 | 200 | 1,600 | 5 | 7.11 | 9.48 | 10.37 | | | 9.77 | 2.66 |
| 3 | 400 | 300 | 1,900 | 0 | 6.83 | 8.25 | 9.14 | 8.50 | 0.64 | 8.54 | 1.71 |
| 4 | 400 | 300 | 1,900 | 5 | 6.83 | 8.77 | 9.66 | 9.10 | 0.56 | 9.06 | 2.23 |
| 5 | 500 | 400 | 2,300 | 0 | 6.62 | 8.02 | 8.91 | | | 8.31 | 1.69 |
| 6 | 500 | 400 | 2,300 | 5 | 6.62 | 8.72 | 9.61 | | | 9.01 | 2.39 |

Note.—Sample 3 is Water A and Sample 4 is Water B. (See Table 1.)

Data for determining $pH_c$ for two of the samples is given in Table 1 with $pH_c$ being taken as 0.1 pH below the pH at which precipitate appeared in less than 16 hours. The actual difference between $pH_c$ and the two minute precipitation time yielded pH unit values of 0.64 and 0.56. Taking this difference to be pH units 0.6, values of $pH_c$ are calculated by subtracting this value from the two minute precipitation value (ppt. pH).

The last column in Table 4 shows the difference between $pH_c$ and $pH_s$. The average difference of the water samples without scale inhibitor is 1.79 pH units while that of the water samples containing inhibitor is 2.46 pH units showing that the use of 5 p.p.m. of inhibitor allows the system to operate at a pH level 0.67 pH units higher than the system lacking inhibitor. The actual improvement variation between uninhibited and inhibited performance in three water samples is about 0.1 pH ($pH_c/5$–$pH_c/0$) as is shown in Table 5.

scale detection meter of the present invention (described hereinafter) as shown in Table 6.

TABLE 6

Meter Reading Versus Time with Constant NaOH Addition

| Delay time (seconds) | No inhibitor | 5 p.p.m. inhibitor |
|---|---|---|
| 40 | 12 | 2.5 |
| | 30 | 2.5 |
| 30 | 22 | 2.5 |
| | 12 | 1.0 |
| 23 | 12 | 1.0 |
| | 25 | 5.0 |
| 19 | 7.0 | 6.0 |
| | 20 | 13 |

The data shown in Table 6 was obtained using water with 400 p.p.m. $Ca^{++}$ and 300 p.p.m. $CO_3^=$. The time delays were achieved by passing the water samples through appropriate lengths of ¼" polypropylene tubing. The two sets of readings shown for each time delay were obtained by adding different amounts of NaOH to the samples.

It is apparent that the readings approach each other as the time delay is reduced and, although not shown in the table, when the delay is as close to zero as is possible, the readings are virtually the same.

The reason for this observed effect is that although precipitation occurs in both water samples, the inhibitor in the inhibited sample prevents the growth of large precipitate crystals keeping the solubility product at a higher value. For this reason, these tests were run by adding constant amounts of NaOH and letting the pH seek its own level rather than keeping the pH constant as was done in earlier work.

When zero time delays are used in the above test, the amount of NaOH required to cause the appearance of faint precipitate in uninhibited water and inhibited water is about the same. While this initial amount of precipitate was the same, the NaOH treated samples differed in two major aspects. First, the uninhibited water had a pH of 9.15 while the pH of the inhibited water was 9.45. Second, the uninhibited water became opaque with precipitate after five minutes while the precipitate level in the inhibited sample remained substantially unchanged at the end of five minutes. Although the faint amount of precipitate at time zero appeared to be same in both the inhibited and uninhibited samples—both to the eye and to the scaling detector—it is believed that the weight of precipitate present must be different. Presumably the precipitate in the inhibited sample was finely divided and remained finely divided with little, if any, growth over the five minute period. In contrast, although the precipitate in the uninhibited sample was finely divided at time zero, the precipitate grew in size over the five minute period sharply decreasing both the solubility of the precipitate particles and the pH.

It is a primary object of this invention to provide a novel method and apparatus for measurement of the actual conditions at which scaling occurs. Another object of this invention is to provide a method and apparatus for simply and reliably predicting the point at which scaling occurs before such a point is reached in a water system. A further object of this invention is to provide an automatic control system for preventing scale formation in water systems. A still further object of this invention is to provide an automatic scale prevention control system which includes total dissolved solids, pH and/or corrosion rate measuring means in addition to the scale measuring means hereinafter described.

These and other objects are accomplished by changing one or more of the Saturation Index's parameters so as to create conditions in a water sample that cause precipitation to occur in the sample. The magnitude of the required change is a measure of how far removed from the precipitation state the water in the system actually is; that is, the larger the change required to cause precipitation in a water sample, the safer is the water system in terms of scale formation. Relating this technique to the Saturation Index, it is apparent that $pH_s$ is determined by making measurements of $Ca^{++}$, the methyl orange alkalinity, the total dissolved solids and the temperature and, from a plot of Saturation Index data, adding together values of pCa, pAlk and pC which equal $pH_s$. However, $pH_s$ becomes significant only after the actual pH, $pH_a$, is measured and compared to $pH_s$. Keeping these relationships in mind, it is apparent to anyone familiar with the art that the $Ca^{++}$ concentration, the alkalinity, the TDS, the temperature or $pH_a$ can be increased to a point where precipitation will occur. The magnitude of the change needed to cause precipitation is a measure of the safety margin under which a system is operating; that is, the difference between scaling and non-scaling conditions. Although the example given above and throughout this specification is illustrated with $CaCO_3$ containing water, the invention can be used for water containing any slightly soluble salt such as alkaline earth metal salts, e.g., $Mg(OH)_2$, $CaSO_4$, $CaSiO_2$, etc., or transition or heavy metal salts, e.g. $Fe(OH)_3$, $$Fe_2(CO_3)_3$$

$PbSO_4$, AgOH, $Zn(CO_3)_2$, etc. In this context it should be noted that the use of $pH_s$ and $pH_c$ values are specific to $CaCO_3$ and are convenient expressions for the relationship among the factors which affect the solubility product, namely, the ion activities, the temperature and the affect of other ions. The relationship of the ion activities at a particular temperature is recognized as the solubility product, $K_s$, and it is this constant which is of interest for slightly soluble salts other than $CaCO_3$. Just as there is a critical pH which is a predictable amount in excess of $pH_s$, so there is a critical solubility product, $K_{sc}$, which is a predictable amount in excess of $K_s$. And, just as one or more of the parameters which constitute the Saturation Index can be increased to cause precipitation in a water sample, one or more of the ions of a slightly soluble salt can be added to a water sample to cause precipitation and so determine the safety margin under which a system is operating. Thus, the present method and apparatus are applicable to any system in which the precipitation of a slightly soluble salt from solution is to be detected or controlled before actual precipitation occurs in the system. The $K_{sc}$ can be determined for any given slightly soluble inorganic salt by the procedures described herein. For example, a solution of a slightly soluble salt can be divided into several subsamples. Each subsample is then treated with known amounts of a soluble salt of the slightly soluble inorganic salt cation in increasingly larger known increments. The subsamples are then observed and the appearance of precipitate for each sample is noted with respect to time. The $K_{sc}$ is equal to the slightly soluble inorganic salt anion and cation concentration of the most concentrated subsample exhibiting no precipitate after a delay time of twelve hours or longer. The solubility constant $K_s$ p.p.t. is similarly calculated and equals the slightly soluble inorganic salt anion and cation concentration of each subsample in which precipitation appeared. The $K_s$ p.p.t. can be plotted as concentration v. time. When log $\Delta K_s$ ($K_s$ p.p.t.—$K_{sc}$) is plotted against log time a straight line plot is obtained which can be mathematically represented by the following mathematical relationship:

$$\log t = a - b \log \Delta K_s$$

The values of $a$ and $b$ are determined by well known analytical geometry techniques. The value of $a$ effects the position of the line and the value $b$ effects the slope of the line. The value of $t$ will be between about 10 and about 1000 seconds.

To illustrate the utility of the method, consider the effect of increasing the $pH_a$ of water; where $pH_a$ just equals $pH_s$ precipitation will occur, but at what point no one could determine before the present invention. In a similar manner, consider the effect of increasing the temperature of water wherein the $pH_a$ equals $pH_s$, the TDS equals 1000 p.p.m., the water temperature is initially 90° F. and pC has a value of 2.07. If the temperature is increased to 150° F., the value of pC raises to 1.53 (see FIG. 6) and the $pH_s$ is reduced by 0.54 (2.07—1.53). The actual pH must be lowered by 0.54 to avoid scaling.

Similar results may be obtained by adding $Ca^{++}$, from $CaCl_2$, for example, or by adding $CO_3^=$ from $Na_2CO_3$ or $NaHCO_3$ to the water. Increasing the TDS is not as practical as other changes since its effect on $pH_s$ is relatively small. For example, doubling the TDS from 1000 p.p.m. to 2000 p.p.m. changes the $pH_s$ by only 0.03 while doubling the $Ca^{++}$ concentration from 100 to 200 p.p.m. changes the $pH_s$ by about 0.3, a ten times greater effect that is caused by doubling the TDS concentration. A direct, one for one effect on $pH_s$ can be obtained by increasing the $pH_a$ since the scaling condition is determined by comparing $pH_s$ to $pH_a$. Hydroxyl ions can be added to the water sample to increase the actual pH.

In one aspect of this invention, one or more of the Saturation Index parameters can be increased until precipitate in formed and detected as a turbidity increase by photometric means and the magnitude of the required change can be measured and used as the safety margin under which the water system is operating. For example, the water sample's temperature could be made increasingly hotter until precipitation occurred and the difference between this test temperature and the water system temperature would be the water system's margin of safe operation.

In yet another aspect of this invention, the water sample may be treated so as to increase one or more of the Saturation Index parameters by a predetermined amount and the magnitude of the precipitated material measured with this measurement being proportional to degree of safety existing in the water system. The presence of increasing amounts of precipitate is indicative of decreasing margins of safe operation.

In still another aspect of this invention, the scale measurement can be used in conjunction with other measurements which are useful in water treatment programs. TDS measurements often are used as an indirect measure of $Ca^{++}$ concentration. By combining the scale measurement and the TDS measurements, TDS could still be used as an indirect measure of $Ca^{++}$ and at the same time be used to measure the chloride ion level. The scale measurement then would be a measure of the other Saturation Index parameters and could cause the addition of acid to lower $pH_a$, could cause the addition of scale inhibitor or, in extreme cases, could override a normal TDS signal and cause all or a portion of the water in the system to be replaced with make-up water of a purer nature. Other measurements which can be used in combination with the scale measurement include pH, corrosion and TDS, either singly or in combination.

DESCRIPTION OF DRAWINGS

FIG. 5 is a graph plotting precipitation pH with scale inhibitor concentration; and FIG. 6 is a Saturation Index graph plotting pCa, P Alk and pC at T°F. and TDS against concentration.

These and other aspects of this invention can best be understood by referring to the following detailed description.

Figure 1:
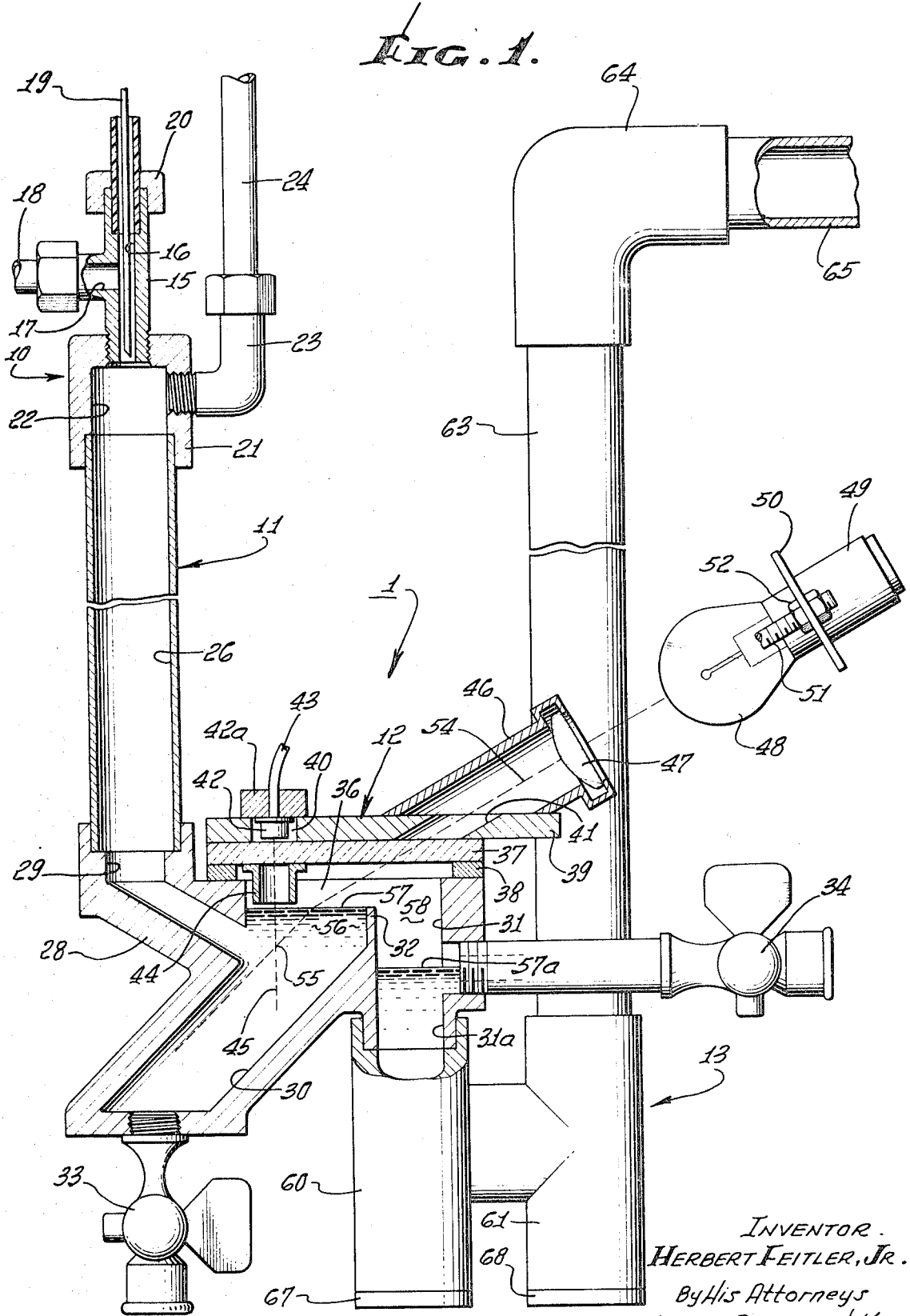
FIG. 1 is a fragmentary cross-sectional view of the scale meter of the present invention.

Referring to FIG. 1 the scale meter or scale detector 1 of the present invention consists of four essential pieces, a mixing head 10, a time delay cell 11, a detection cell 12 and an outlet assembly 13.

The mixing head 10 includes a T-shaped element or T15 having a vertical longitudinal bore 16 and a horizontal side bore 17 communicating with the bore 16. An inlet conduit 18 is connected to a water system (not shown) and communicates with the side bore 17. A capillary tube 19 extends longitudinally into the bore 16; the upper end of the capillary tube is connected to a reagent reservoir (not shown). The tube 19 secured to the tip of T by collar 20. The bottom leg of the T is connected to a hollow head element 21 having a central chamber 22 which communicates with the longitudinal bore 16. An elbow 23 is secured to the side of the element 21; the central bore of the elbow communicates with chamber 22. A vertical hollow tube 24 extends upwardly from the elbow and is connected into a gas-liquid trap (not shown). The head element is connected to the top of the time delay cell 11 and the central chamber 22 communicates with the large longitudinal bore 26 of the cell. The cell extends vertically downward; its bottom end is secured to the frame 28 of the detector cell.

The detector cell frame 28 includes an inlet bore 29, a detection chamber 30, an outlet chamber 31 and an outlet bore 31a. The inlet bore communicates with the central bore 26 of the time delay cell 11 and the chamber 30. The chamber 31 communicates with chamber 30 and outlet bore 31a. A weir 32 separates chamber 30 from chamber 31. A first stopcock 33 is attached to the bottom of the frame and communicates with the bottom portion of chamber 30. A second stop cock 34 is secured to the side of the frame and communicates with the top portion of outlet chamber 31. There is a large opening 36 on the top of the frame which communicates with chambers 30 and 31. A transparent plate 37 is secured over the opening and is supported by a ring seal 38 resting on the top of the frame about the opening. A support plate 39 having a first orifice 40, and a light path orifice 41 is positioned over plate 37 and compresses down thereupon to form a gas-tight and liquid-tight seal between the plate 37, the ring seal 38 and the top of the frame. The plate 39 is attached to the frame by threaded bolts (not shown). A photo cell 42 is located in a detection orifice 40 and supported therein by support element 42a which is secured to plate 39. An electrical lead 43 is connected to the photo cell and passes through the support element 42a and is connected to an amplifier device (not shown). Located directly beneath the photo cell is a cylindrical light shield 44 having a central bore. The shield is connected to plate 37; the longitudinal bore of the shield is actually aligned with the optimum light detection path 45 of the photocell. A hollow lense support element 46 is attached to the top of plate 39 in axial alignment with orifice 41. A lense element 47 is attached to the top portion of support element 46. An electric light bulb 48 mounted in bulb socket 49 is positioned above the lense element 47. The socket is secured to frame 50 which is adjustably mounted to threaded lugs 51 by threaded nuts 52. The lower ends of the lugs (not shown) are securely attached to the support plate 39. The light bulb, lense and orifice 41 are in axial alignment with light path 54. The focal point of the lense is at point 55; this is the point of intersection between the light detection path 45 and the light path 54.

The outlet assembly 13 includes first and second T traps 60 and 61 respectively, a vertical standpipe 63 and a hollow elbow 64 which connects the top of pipe 63 to an outlet pipe 65. The outlet port 31 of the frame communicates through trap 60, trap 61, pipe 63, and elbow 64 to pipe 65. Both T traps have removable base elements 67 and 68, respectively, which seal off the hollow interiors of the traps.

Operation of the scale detector device

Water from the water system (not shown) flows through inlet conduit 18 through the side bore 17 and through the longitudinal bore 16. Optionally, the water can be preheated in a heater (not shown) to a predetermined temperature prior to its entry into the side bore 17. In the bottom portion of the longitudinal bore the water sample is mixed with the reagent flowing out of the capillary tube 19 at a predetermined rate. The reagent reservoir (not shown) is preferably a constant head type which provides a constant flow rate of the reagent into the water sample. A 15% aqueous sodium hydroxide solution has been found to be a satisfactory reagent when combined with the water samples in ratios of 50:1 to 250:1 water sample: reagent. The capillary tube terminates with an angular cut just inside the opening of the longitudinal bore in the lower end of the T so that the reagent-water sample are mixed before entering the central chamber 22. Since the mixture of reagent and water causes precipitation of scale and since such scale tends to coat surfaces, it is important that the reagent combine with the water sample close enough to the end of the T to keep scale from forming in the longitudinal bore and yet far enough away from the end of the longitudinal bore so that mixing of the reagent and water sample occurs before the reagent-water mixture enters the delay cell where stratification could occur. The configuration of the delay cell is important in terms of the ratio of the surface area of the cell to the retention time of the reagent-water sample. Long-narrow cells expose large surface areas to the reagent-water sample which will readily lead to precipitation of scale on the walls. Such scale will cause stripping of precipitate from subsequent segments of the samples before they reach the detection cell. Short-wide delay cells have low velocities of flow and the total water sample in the delay cell tends to mix as a whole rather than flow through the delay cell as a column. It is important to minimize stratification of the sample and the formation of vortices in the sample in order to provide a true sample for the detection cell at all times. A time delay cell about 16 inches long and about 0.6 inch in diameter provides good performance and provides delays of about 30 to 40 seconds with flow rate of about 120 ml. per minute. However, it is to be understood that a wide variety of other cell lengths, cell diameters and water sample-flow rate combinations will also provide equally good results as long as the reagent-water sample is given sufficient time to form detectable precipitation. In order to minimize scaling on the walls of the delay cell, the delay cell is positioned in a vertical position to give the most unfavorable conditions for scaling.

From the delay cell the sample is directed through inlet passage into the light beam path 54 and the photo cell detection path 45 in the upper portion of chamber 30. the sample then flows horizontally across chamber 30, over the top of the weir 32, down into chamber 31 and out the outlet passage 31A where it exits through the outlet assembly 13. The traps 60 and 61 change the flow direction of the exiting sample from vertically downward to vertically upward. The vertical flow is preferred to other angles of flow since scale formation is minimized on vertical surfaces. Large precipitation particles which are too dense to be carried out of the flow system due to insufficient flow velocities settle to the bottom of the traps. Periodically these traps are cleaned by removing their base elements. The height of the outlet pipe 65 and the side bore 17 is instrumental in maintaining the longitudinal bore 26 and chamber 22 full of liquid and the level of water surface 57a with respect to the level of water surface, 57.

As stated above, the focal point of the lens element 47 is approximately at point 55, that is the point where the light path 54 and the light detection path 55 intersect. When the light hits the water surface 57 there is a certain degree of light reflection from the surface which could have a great effect on the photocell response if such light was not shielded from the photo cell by light shield 44. Thus, the light shield assures that the photo cell responds only to light scattered or reflected under the water surface from the surface of the precipitate particles. Principles and techniques of measuring light scattering in liquid samples are well known and light scattering has been measured through angles of from almost zero through 90° incident to the light path. The preferred angle is between about 30° and about 70° incident to the light path. Although the scattered light is probably the greatest at incident of 90°, in a compact space, which minimizes the dead zone in a light detection path, an angle of 40° provides adequate sensitivity and allows for good flow characteristics of the fluid sample. In the present device flow characteristics of the fluid are of greater importance to the successful operation of the device than in ordinary turbidimeters. Since the formation of precipitate is time dependent as explained above, the residence time of the liquid sample in light detection region must be kept constant and minimal. The water sample entering from the inlet passage is directed directly into the light detection zone surrounding point 55. At this point the light intensity is maximized since this is the focal point of the light source. The light intensity penetrating the water below the surface 57 decreases with increased precipitate density. Thus, for the successful operation of the present device the distance of light path travel through the water sample 56 must be kept to a minimum in order to have maximum light intensity for scattering measurements. The small angles between the axis 45 and 54 also increase the light path in the water between the water source and the photocell, thus decreasing the light intensity; angles of less than 30° are preferably avoided. The axis 54 is 60° from the vertical in air and due to the difference in refractive index between air and water, this axis is refracted to about 40° from the vertical in the water. For light that is not scattered by the precipitate, the light travels into the lower portions of chamber 30. In this region the light is reflected off the cell walls and has a minimal affect on the photo cell due to the angle of the chamber walls and the axis 45. The bottom portion of chamber 30 is a dead zone with respect to water flow. The water sample in this dead zone has a minimal affect on the precipitate measurement since it lies outside the photo cells light detection path 45. After long use of the present device, a deposit of precipitate will build up in the bottom of chamber 30; most of this precipitate is built up by the gradual settling of heavy pricipitate particles in the sample. This precipitate is readily flushed out of the chamber by opening the stop cock 33.

Between the transparent plate 37 and water surfaces 57 and 57A there is trapped an air pocket 58. The air pocket serves an essential function in the present device. The air pocket separates the lower surface of the transparent plate from the water so that the lower surface of the transparent plate will be free of precipitate and will not form an opaque layer of scale.

Some water samples have a tendency to form a surface film which can effectively shield or block the light beam from penetrating into the water in chambers 30. This problem can be greatly minimized by using a surface active agent in the water sample. A surface active agent can be conveniently added to the water sample before it enters the T-element 15 in the scale meter of FIG. 1. The addition can be easily carried out having the water sample enter a mixing T (not shown) wherein it is mixed with a surface active agent prior to entering conduit 18. Even with the use of a surface active agent, some water samples have a tendency to form a film. The construction of the present detection cell 12 minimizes the problems encountered with filming. The weir 32 which separates chambers 30 and 31 provides a means of maintaining the level of the water 57A in chamber 31 below the top of the weir. Any film forming on the surface 57 of the sample in chamber 30 flows over the top of the weir down into chamber 31. This provides a means of maintaining the surface of the water sample in chamber 30 relatively free of film. The film residuals that built up in chamber 31 are drawn off at intervals through stop cock 34.

Figure 2:
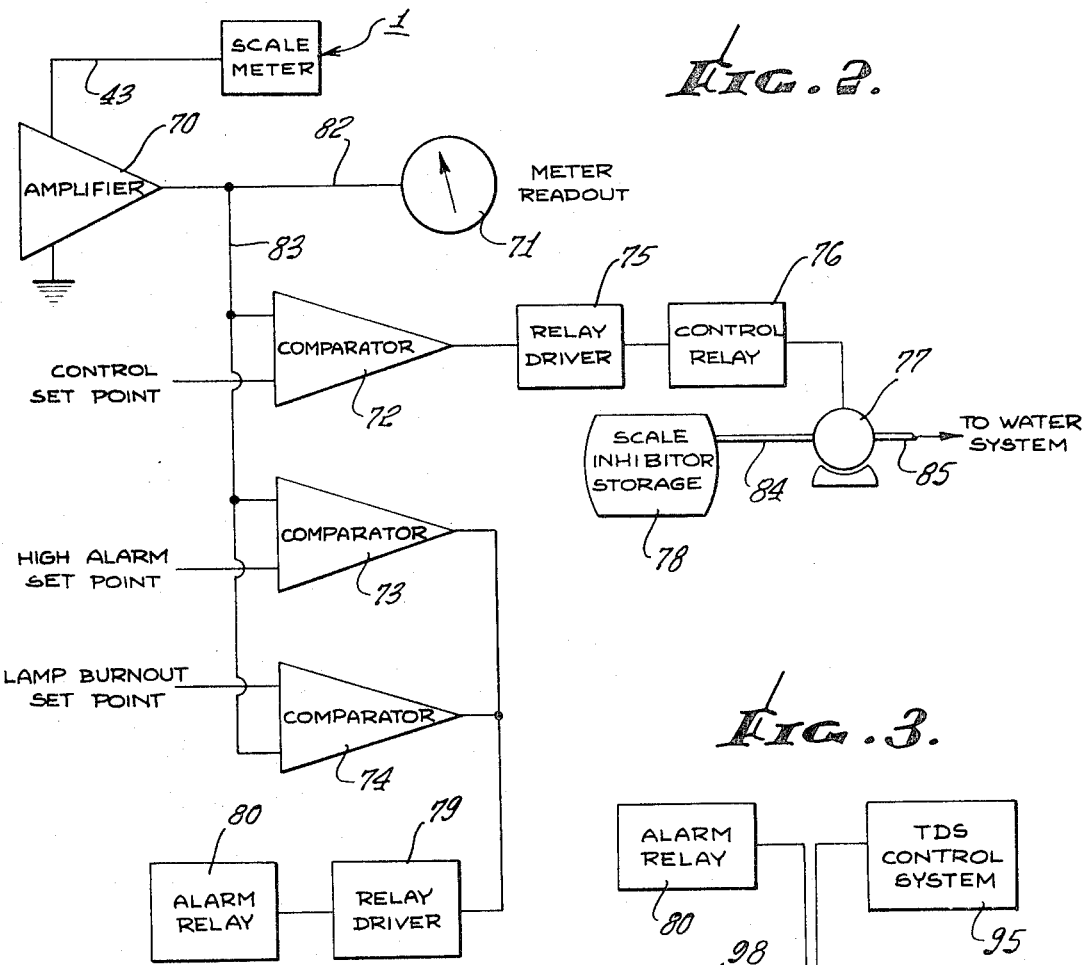
FIG. 2 is a block diagram of a water treatment control system utilizing the scale meter of the present invention.

In FIG. 2 there is schematically shown a scale control system for a water system employing the scale meter or scale detection meter of the present invention. This control system comprises a scale meter 1, an operational amplifier 70, a meter readout 71, first, second and third comparators 72, 73 and 74, respectively, first relay driver 75, a control relay 76, a metering pump 77, a scale inhibitor reservoir or storage tank 78, and a second relay driver 79, and an alarm relay 80. The electrical signal from the scale meter is transmitted over an electrical lead 43 to the operational amplifier. The output signal from the operational amplifier is carried over electrical leads 82 and 83 to the meter readout and the three comparators.

The first comparator 72 is used as a control device. The signal from the amplifier is compared to the control set point signal, and when this latter signal is less than the signal from the amplifier the comparator energizes the relay driver 75 which in turn activates the control relay 76. The control relay activates the metering pumps 77 which pumps a predetermined amount of a scale inhibitor from the scale inhibitor storage tank to the water system (not shown) via pipes 84 and 85.

The second comparator 73 is an alarm device. The signal from amplifier 70 is compared to the high alarm set point signal; when the amplifier signal exceeds the high alarm set point signal, the second comparator energizes the second relay driver 79 which in turn energizes the alarm relay 80. The alarm relay in turn can activate conventional alarm devices such as light, whistles, bells and the like (not shown). In addition the alarm relay can be used to override some other control signal to prevent serious damage from occurring in the water system. If for some reason the water sample entering the scale meter is restricted in flow or entirely shut off, the reagent will continue to be added to the stagnant water in the scale meter. This eventually causes heavy precipitation and in turn will cause the scale meter to emit a very strong signal which will exceed the signal of the high alarm set point. Thus the high alarm system functions both as an alarm system that indicates the water system is operating under scaling conditions, and as a system to indicate that the water sample is no longer flowing to the scale meter.

The third comparator 74 is used as a lamp burn-out indicator device. The signal from the amplifier 70 is compared with the lamp burn-out set point signal; when the latter signal is stronger than the signal from amplifier 70, the third comparator activates the relay driver which in turn activates the alarm relay as described above. The lamp burn-out alarm is actuated when a low signal is received from the scale meter; such a signal usually is the result of a lamp burn-out.

The system shown in FIG. 2 can be used in combination with one or more other instruments or devices or systems which sense other water parameters, such as total dissolved solids, pH and corrosion. Although the scale meter can alleviate the need for pH and corrosion measurements, the total dissolved solids measurements will continue to be of value since scale inhibitors do not correct for all condtions due to dissolved solids in the water.

Figure 3:
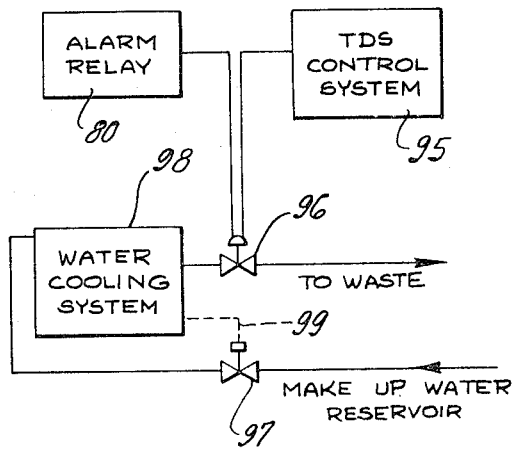
FIG. 3 is a block diagram of a water cooling system utilizing the scale meter of the present invention in conjunction with a TDS control system.

Another water control system employing the scale meter of the present invention and a conventional total dissolved solid control system is illustrated in FIG. 3. This control system comprises an alarm relay 80 which is actuated by a system similar to the one described in FIG. 2, a total dissolved solid control system comprised of a resistivity electrode detector (TDS control system) 95, first and second control valves 96 and 97, respectively, and a water cooling system 98 which has a cooling tower (not shown). A scale meter (not shown) is connected to the water cooling system to actuate the alarm relay 80 when the water in the water cooling system reaches scaling conditions. In the normal operation of this system, the TDS control system 95 actuates valve 96 to dump water from the system when the total dissolved solids of the water reaches a predetermined level. These systems are well known in the art and are used extensively in industry. The water that is removed is made up with make-up water from the make-up water reservoir when valve 97 is actuated. The make-up water dilutes the water in the cooling system and lowers the concentration of the total dissolved solids. The make-up water control valve 97 can be actuated by a float-type mechanism which is schematically illustrated by dotted line 99. In the event the TDS control system fails, the scale meter system will actuate the alarm relay when scaling conditions are reached in the water. The signal from the alarm relay will override the TDS control system signal and actuate valve 96 to dump water from the water cooling system allowing the water to be diluted with make-up water as described above.

Results obtained using the preferred Scale Meter embodiment are given in Table 7 and the same data is plotted in FIG. 5.

TABLE 7
pH of Precipitation at various inhibitor concentrations

| Water | Ca++ | CO₃ | Scale inhibitor | | | | | |
|---|---|---|---|---|---|---|---|---|
| | | | 0 p.p.m. | 1.25 p.p.m. | 2.5 p.p.m. | 5.0 p.p.m. | 10 p.p.m. | 20 p.p.m. |
| A | 400 | 300 | 9.38 | 9.65 | 9.76 | 9.92 | 9.95 | 9.98 |
| B | 300 | 200 | 9.65 | 10.1 | 10.25 | 10.30 | 10.38 | |

Referring to FIG. 5, curve 90 is a plot of the Water A data and curve 91 a plot of the Water B data. The data is interesting from several respects. First, the difference between the zero p.p.m. pH values of waters A and B is 0.27 while the difference between their $pH_s$ values from the Saturation Index is 0.28. This almost perfect agreement is good confirmation of both the Scale Meter method and apparatus. Second, the results show that increasing amounts of scale inhibitor do not allow proportionable higher operating points and this observation is in good agreement with present water treatment practice. Third, the results show that the higher the concentration of the scale forming ions the less the performance improvement yielded by the same amount of scale inhibitor and this observation also is in agreement with water treatment practice.

Figure 4:
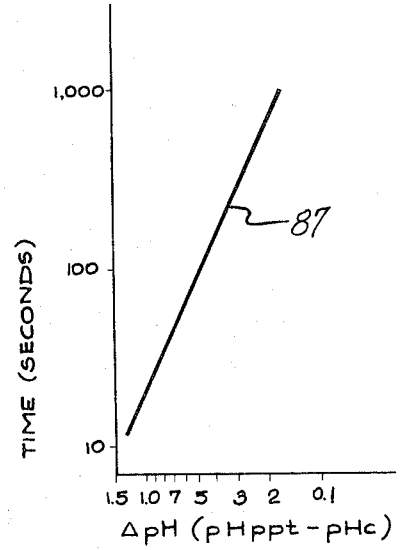
FIG. 4 is a graph plotting the difference between $pH_{ppt}$ and $pH_c$ (log scale) with time (log scale)

Referring to FIG. 4, curve 87 is a log-log plot of data from Table 1 and Table 8, and illustrates the time dependency of a scale meter method and apparatus. FIG. 4 shows that there is a linear relationship between the log of the delay time versus the log of $\Delta pH$, the difference between the pH of precipitation, $pH_{ppt}$, and the critical pH, $pH_c$. The delay time varies from ten seconds to one thousand seconds while the $\Delta pH$ ranges from 0.2 to 1.4 with a range of 0.6 to 0.85 for a time delay of from one minute to one-half minute.

Table 6 presented data showing that delay times of less than 30 seconds could lead to ambiguous results. This data is confirmed in Table 8, where no significant difference exists between the results obtained with inhibited and uninhibited waters. When flow rates were reduced in my scale detection meter so that delay times exceed one minute instrument response becomes sluggish as the resulting water sample mixed rather than displaced the reagent water sample as a column from the time delay cell. By using a larger cross section delay tube and appropriately higher flow rates longer delay times could be used. Times of up to five minutes would seem practical. Thus, time delays ranging from 30 seconds to five minutes are possible and, per curve 87, the Δ pH range would be from 0.28 to 0.92.

The relationship, as shown in FIG. 4, between Δ pH and time can be expressed as follows between the time units of about 10 and 1000 seconds and Δ pH units of about 1.4 and 0.2.

$$\log \Delta\, pH = \frac{\log t\ (\text{in seconds}) - a}{-b},$$

where $a$ and $b$ are constants whose values are dependent on the time allowed for precipitate growth, the photometer sensitivity, the temperature effect on reaction velocity and the primary salt effect on reaction rates in ionic solutions. Where the water sample contains less than 50 p.p.m. of ions other than calcium, carbonate and bicarbonate, the value for the constant $a$ is $1.4\pm.1$ and the value for the constant $b$ is $2\pm.2$. Where the water sample contains concentrations higher than 50 p.p.m. of ions that have a significant primary salt effect, such as $Mg^{++}$ and $SO_4^=$, the value of constant $a$ is within the range of 1.3 to 1.8 and constant $b$ is within the range of 1.6 to 2.2.

TABLE 8

Δ pH Versus time at constant NaOH addition

| Delay time (seconds) | Inhibitor concentration | $pH_{ppt}$ | $pH_c$ | Δ pH |
|---|---|---|---|---|
| 18 | 0 | 9.67 | 8.54 | 1.13 |
| 18 | 5 | 9.67 | 9.06 | 0.61 |
| 23 | 0 | 9.55 | 8.54 | 1.00 |
| 23 | 5 | 9.62 | 9.06 | 0.56 |
| 43 | 0 | 9.32 | 8.54 | 0.78 |
| 43 | 5 | 9.36 | 9.06 | 0.30 |
| 50 | 0 | 9.25 | 8.54 | 0.71 |
| 50 | 5 | 9.38 | 9.06 | 0.38 |

The water sample used in obtaining the test data shown in Table 8 contained 400 p.p.m. $Ca^{++}$ and 300 p.p.m. $CO_3^=$. In all instances the critical pH was exceeded so that some amount of precipitate formed. Time delays of 18 and 23 seconds result in ambiguous results as previously discussed. Their pH values are below 0.8 because of the reduction of pH effect of large particle precipitate formation. The pH values of the inhibited 43 and 50 second data show that precipitate should form and the meter readings confirm the presence of precipitate. However, this amount of precipitate is safe from the standpoint that the inhibitor will keep additional precipitate from forming. In actual operation, the presence of any amount of precipitate is undesirable.

It should be noted that the curve shown in FIG. 4 is specific for a water having various amounts of $Ca^{++}$ and alkalinity but being substantially free of ions such as $SO_4^=$ and $Mg^{++}$. Also, the curve only applies when the sample is at a temperature of about 80° F. or higher. Both of these restrictions on the universality of the curve are readily explainable by the well known concepts relating to the temperature effect on reaction velocities and to the primary salt effect on reaction rates in ionic reactions.

To illustrate the magnitude of these effects, a water was tested which had 400 p.p.m. $Ca^{++}$, 300 p.p.m. alkalinity, 1200 p.p.m. $Na_2SO_4$, 300 p.p.m. $MgCl_2$ and 600 p.p.m. NaCl. Table 9 compares $pH_{ppt}$ results versus temperature for this salty water and for a water having 400 p.p.m. $Ca^{++}$, 300 p.p.m. alkalinity and negligible quantities of $Na_2SO_4$, $MgCl_2$ and NaCl. A delay time of about 75 seconds was used since delay times of 40 seconds do not produce useful information at reasonable temperature and pH increases in the salty water.

TABLE 9

$pH_{ppt}$ vs. Temperature results

| Temperature (° F.) | $pH_s$ | Salty water | Salt-free water | Salty, salt-free difference |
|---|---|---|---|---|
| 68 | 6.95 | (¹) | 8.90 | |
| 80 | 6.80 | 9.30 | 8.70 | 0.60 |
| 90 | 6.68 | 9.15 | 8.60 | 0.50 |
| 100 | 6.58 | 8.95 | 8.50 | 0.45 |
| 110 | 6.49 | 8.75 | 8.40 | 0.35 |
| 120 | 6.40 | 8.65 | 8.30 | 0.35 |

¹ No precipitation.

The data in Table 9 shows that in salt-free water the change in $pH_{ppt}$ versus temperature becomes equal to that predicted by the Saturation Index—about 0.1 decrease for each 10° F. temperature increase—at temperatures above 80° F. while a temperature of 110° F. must be exceeded before the salty water yields results equal to those of the Saturation Index. This difference in performance is due to the effect on the rate of precipitate growth caused by temperature and primary salts and does not reflect a difference in solubility other than that predicted by the Saturation Index. However, the data does indicate that a practical instrumentation system must take these effects into account and that it is necessary to heat the salty water when the temperature is below 80° F. and is desirable when the water temperature is below 110° F. It should be understood that the difference between the $pH_{ppt}$ values of salty and salt-free waters varies depending on the type and amount of the salts, the water's temperature and the delay time of the instrument.

The data in Table 9 shows the interrelation of the water's temperature, salt content, delay time and $pH_{ppt}$ and serves to illustrate how a Scale Meter would be used in actual service.

Earlier, it was established that a correlation existed between $pH_s$ and $pH_c$. FIG. 4 shows the relationship between time and the amount the pH is increased above $pH_c$ to cause precipitate formation. Knowing the time constant of instrument, FIG. 4 is referred to to determine the appropriate pH increase. This pH adjustment is further increased to compensate for the primary salt effect and for the effect of temperature on solubility as predicted by the Saturation Index. An example is given below for the case where the pH is increased by adding NaOH. When the Saturation Index parameter change used is the addition of a reagent as opposed to increasing the temperature and the water sample's temperature is below about 80° or 90° F., the water is heated before the reagent addition to offset the temperature effect on reaction velocity.

As an example, consider a water with a $pH_s$ of 6.83, an actual pH of 8.90, an average temperature in the system of 90° F. and a maximum exposure temperature in the system of 140° F. Also, assume that the instrument has a water preheater which heats the water sample to 120° F. and has a delay time of 75 seconds. From FIG. 4, the pH increase associated with a 75 second delay is 0.55 and, for a salt-free water whose maximum exposure temperature is 120° F., enough NaOH would be added to increase the sample's pH from 8.90 to 9.45 as is required by the delay factor. However, the maximum exposure temperature is actually 140° F. and, therefore, the water's pH is increased by an additional 0.2 to offset the decrease in solubility predicted by the Saturation Index which is about 0.1 for each 10° F. If the water had 1200 p.p.m. $Na_2SO_4$ and 300 p.p.m. $MgCl_2$, from Table 9 it would be necessary to increase the water's pH by an additional 0.35 to offset the primary salt effect. Thus, the water's pH would be increased by $0.55+0.2+0.35=1.10$ for salty water and by $0.55+0.2=0.75$ for salt-free water.

FIG. 5 shows the relationship between $pH_{ppt}$ and scale inhibitor concentration. Curve 90 is for a salt-free water with a $pH_s$ of 6.83 and shows that scale inhibitor is needed when the $pH_{ppt}$ exceeds 9.40. In this example the water's pH of 8.90 is increased by 0.75 to 9.65. From curve 90 it can be seen that at least 1.25 p.p.m. of scale inhibitor is needed to prevent scale formation.

The head difference between the Sample Cell and the NaOH container would be adjusted so as to raise the water's pH to 9.65 as measured by some external pH measuring device. This constant amount of NaOH would continue to be added and when the scale inhibitor dropped below about 1.25 p.p.m., the control circuit would be actuated to add more scale inhibitor. Even if more than 1.25 p.p.m. scale inhibitor was present but the scale forming ion concentrations increased the Scale Meter would signal for more inhibitor. This also would occur if the actual pH increased. In a similar manner, the water would be safe at less than 1.25 p.p.m. inhibitor residual if the actual pH decreased or if the concentration of scale forming ions decreased. In either case, the Scale Meter would reflect the need for scale inhibitor. For example, if the actual pH decreased to 8.50, the NaOH addition would not raise the pH to 9.65 and 1.25 p.p.m. scale inhibitor would not be needed to prevent scaling. Thus, although the Scale Meter is initially set up for a particular set of conditions, its operating principle automatically compensates for changes in those conditions. The usual compensating adjustments for differences between the sample's and the system's temperatures should be made as predicted by the Saturation Index. It should be noted that the scale inhibitor performance improvements shown are given for a particular commercially available formulation and are not intended to convey the impression that any scale inhibitor will produce the same results when used in conjunction with the Scale Meter. The performance capabilities of scale inhibitors can be evaluated rapidly by use of the Scale Meter and this evaluation can be made in the laboratory as well as in an operating system. Also, the Scale Meter can be used with water systems not using scale inhibitors and in these instances the control action taken could be the addition of acid to lower the actual pH or the force bleeding of water with concentrated solids out of the system.

In an alternative embodiment of the present invention, the first comparator 72 of the water control system of FIG. 2 is replaced with a proportional controller of conventional design (not shown) which will actuate a metering pump such as pump 77 on a proportional basis to increase the scale inhibitor concentration of the system's water to prevent scaling.

I claim:
1. A method of determining the scaling nature of a water which comprises the following steps:
 increasing the value of one or more of the following in a sample of said water: pH, alkalinity, slightly soluble inorganic salt ion concentration, total dissolved solids and temperature to cause the precipitation of particles in said sample;
 holding said sample for a predetermined length of time to allow said precipitate particles to grow to a readily detected size; and
 comparing the amount of precipitate formed in said water by optical means to a standard representing an amount of precipitate in water known to be scale forming and determining if said water sample has a lesser amount of precipitate.

2. A method of inhibiting scaling in a water system which comprises the following steps:
 increasing the value of one or more of the following in water sample of said water system;
 pH, alkalinity, slightly soluble inorganic salt ion concentration, total dissolved solids and temperature to cause the precipitation of particles in said sample;
 holding said sample for a predetermined length of time to cause said precipitate particles to grow to a size detectable by light scattering techniques;
 passing a light beam into said sample and detecting the scattered light in a photo cell, said photo cell emitting an electronic signal responsive to the detected scattered light;
 amplifying said signal in an amplifying means;
 comparing said signal to a second signal in a comparator which, when said signal is larger than said second signal, actuates means for increasing the scale inhibitor concentration in the water or decreasing the value of one or more of the following in the water in said water system by diluting the water with fresh water until said second signal is larger than said signal: pH, alkalinity, slightly soluble inorganic salt concentration, total dissolved solids and temperatures, said second signal being representative of scaling conditions in said water system.

3. The method according to claim 2 wherein the pH of said sample is increased to a predetermined pH, $pH_{ppt}$, to cause the precipitation of particles in said sample; and said sample is held for a predetermined length of time, said time being between 10 and 1000 seconds; and where the difference between $pH_{ppt}$, the precipitation pH and $pH_c$, the critical pH, is between 0.2 and 1.4 pH units.

4. A method of inhibiting scaling in a water system which comprises the following steps:
 increasing the value of one or more of the following in a water sample of said water system:
 pH, alkalinity, slightly soluble inorganic salt concentration, total dissolved solids and temperature to cause the precipitation of particles in said sample;
 holding said sample for a predetermined length of time to cause said precipitate particles to grow to a size detectable by light scattering techniques;
 passing a light beam into said sample and detecting the scattered light in a photo cell, said photo cell emitting an electronic signal responsive to the detected scattered light;
 amplifying said signal in an amplifying means;
 feeding said signal into a proportional controller means which, when said signal exceeds a predetermined threshold strength, actuates means for proportionately increasing the scale inhibitor concentration in the water or proportionately decreasing the values of one or more of the following parameters in the water in said water system by diluting the water with fresh water until said signal is below said threshold level: pH, alkalinity, slightly soluble inorganic salt concentration, total dissolved solids and temperature.

5. The method according to claim 4 wherein said sample is held for predetermined length of time $t$ according to the following mathematical relationship:

$$\log t = a - b \log \Delta K_s$$

wherein $t$ is time in seconds, $\Delta K_s$ is the difference between the $K_{s\,ppt}$ and the $K_{sc}$ of said system's water, and $a$ and $b$ are constants determined by plotting $\log t$ against $\log \Delta K_s$ with respect to the system water wherein $t$ has a value between about 10 and about 1000 seconds.

6. A scaling detector for water systems which comprises:
 a frame having an inlet bore, a chamber and an outlet bore, said chamber communicating with said inlet and outlet bores, said frame having a transparent window opening into said chamber;
 a longitudinal tube attached to said frame and communicating with said inlet bore, said tube extending vertically upwardly from said frame;
 a means of introducing water from a water system into the top of said tube;
 a means of introducing a reagent into the top of said tube;
 a light source situated above said window so as to direct a light beam into said chamber; and
 a photo cell situated above said window to detect light scatter from said beam, said photo cell having a detecting axis which is offset at angle of less than 90° to said beam's axis.

7. The scale detector according to claim 6 wherein said cell includes means of shielding said photo cell from said light beam and light reflected from the surface of said water.

8. The scale detector according to claim 6 wherein said window has a bottom surface and said photo cell has an optimum detection path, and wherein a longitudinal shield element having a longitudinal bore is connected to the bottom surface of said window in axial alignment with the optimum detection path of said photo cell, said shield extends downwardly into said chamber.

9. The scale detector according to claim 6 wherein said detection cell includes a standpipe that extends upwardly from said cell to a predetermined height above said cell, said standpipe having a bottom end communicating with said outlet bore and a top end communicating with waste disposal means.

10. The scale detector according to claim 6 wherein said reagent introducing means introduces a reagent into the water introduced into the top of said longitudinal tube to raise the pH of said water to a predetermined value, $pH_{ppt}$, to cause the formation of precipitate particles in said water, and said tube is of a predetermined length and cross-sectional area to hold said water flowing through said tube for a predetermined length of time, said time being between 10 and 1000 seconds, to allow the precipitated particles to grow to a detectable size when the difference between $pH_{ppt}$, the precipitation pH, and $pH_c$, the critical pH of the water, has a value between 0.2 and 1.4 pH units.

11. The scale detector according to claim 6 wherein said light beam has a focal point and said focal point intersects the optimum detection path of said photo cell.

12. The scale detector according to claim 11 wherein a longitudinal shield element having a longitudinal bore is connected to the bottom surface of said window in axial alignment with the optimum detection path of said photo cell, said shield extends downwardly into said chamber above the focal point of said light beam.

13. The scaling detector according to claim 6 wherein said water and reagent introducing means comprises a hollow element having an upper end and a lower end, and having a first longitudinal bore axially aligned with said longitudinal tube and a side bore communicating with said first bore, the upper end of said element being connected to the top of said longitudinal tube with said first bore communicating with said longitudinal tube, a capillary tube extending the length of said first bore, the lower end of said longitudinal tube opening into the lower end of said first bore, a reagent reservoir, means for transporting reagent from said reservoir into said capillary at a relatively constant volume rate, and means for introducing water from said water system into said side bore.

14. The scale detector according to claim 13 wherein said water introducing means includes a means of introducing a surface active agent into the water from said water system.

15. The scale detector according to claim 13 wherein the lower end of said hollow element is connected to a head element having a central chamber and flowover means, said head element being connected to the top of said longitudinal tube, said central chamber communicating with the side bore and said longitudinal bore.

16. The scale detector according to claim 15 wherein said flowover means is comprised of an elbow having a bore, and a pipe, said elbow being connected to said head, said pipe having one end extending upwardly from said elbow for a predetermined height, and an opposite end of said pipe being connected to waste means, the bore of said elbow communicating with said central chamber and said pipe.

17. The scale detector according to claim 6 wherein said chamber has a top end and a bottom end, said window opens into the top of said chamber, and said inlet port and outlet port opens into said chamber at opposing ends thereof and below said window.

18. The scale detector according to claim 17 wherein the chamber of said cell is divided into first and second portions by a weir extending upwardly from the bottom of said chamber, said weir having a top portion spaced apart from said window, said first portion communicating with said inlet port, and situated below said photo cell, said second portion communicating with said outlet port.

19. The scale detector according to claim 18 wherein said frame includes a longitudinal standpipe extending upwardly therefrom, said standpipe having an upper and a lower end, the lower end of said standpipe communicating with said outlet port and satid standpipe being of a predetermined height so as the location of the water level in the second portion of the chamber will be below the top of the weir, the lower end of said standpipe communicating with waste disposal means.

20. A scaling detector according to claim 18 wherein said water introducing means includes a means of introducing a surface active agent into the water from said water system.

21. An improved scaling control system for a water system, said water system having means for dumping water from said water system, means for replenishing said water system with make up water, means for actuating said replenishing means when the amount of water in said water system falls to a predetermined level, a means of actuating said dumping means when the total dissolved solids, as measured by the total dissolved solids control system, of the water in said water system reach a predetermined level, said total dissolved solids control system being connected to said dumping actuating means; wherein the improvement comprises a scaling detector which detects if the water is under scaling conditions and actuates said dumping means when the water is under scaling conditions, said scale detector having a frame having an inlet bore, a chamber and an outlet bore, said chamber communicating with said inlet and outlet bores, said frame having a transparent window opening into said chamber, a longitudinal tube attached to said frame and communicating with said inlet bore, said tube extending vertically upwardly from said frame, a means of introducing water from said water system into the top of said tube, a means of introducing a reagent into the top of said tube to cause the precipitation of particles in the water, a light source situated above said window so as to direct a light beam into said chamber, and a photo cell situated above said window to detect light scattered by said particles in the water from said beam, the detecting axis of said cell being offset at an angle of less than 90° to said beam's axis, said photo cell being connected to said dumping actuating means.

References Cited

UNITED STATES PATENTS

| | | | |
|---|---|---|---|
| 1,828,894 | 10/1931 | Freygang | 356—103 X |
| 1,977,359 | 10/1934 | Styer | 23—230 |
| 2,254,782 | 9/1941 | Riche | 23—253 R |
| 2,361,235 | 10/1944 | Pick | 210—96 X |
| 3,309,956 | 3/1967 | Hach | 356—103 |

MORRIS O. WOLK, Primary Examiner

R. M. REESE, Assistant Examiner

U.S. Cl. X.R.

23—253 R; 210—96; 356—103